United States Patent
Heinemann

(10) Patent No.: US 7,146,470 B2
(45) Date of Patent: Dec. 5, 2006

(54) REAL-TIME MOTOR CONTROLLER WITH ADDITIONAL DOWN-UP-LOADABLE CONTROLLER FUNCTIONALITY

(75) Inventor: Gerhard Heinemann, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 359 days.

(21) Appl. No.: 10/661,280

(22) Filed: Sep. 12, 2003

(65) Prior Publication Data
US 2004/0059867 A1 Mar. 25, 2004

(30) Foreign Application Priority Data
Sep. 20, 2002 (DE) ................. 102 43 856

(51) Int. Cl.
*G06F 12/00* (2006.01)
(52) U.S. Cl. ............... 711/151; 711/150; 711/154; 711/158; 700/18; 713/164; 714/25; 717/1
(58) Field of Classification Search ............... None
See application file for complete search history.

(56) References Cited

U.S. PATENT DOCUMENTS

| | | | |
|---|---|---|---|
| 5,412,791 A * | 5/1995 | Martin et al. ............... | 711/114 |
| 5,421,017 A | 5/1995 | Scholz et al. ............... | 717/170 |
| 5,754,424 A * | 5/1998 | Melvin ........................ | 700/37 |
| 6,256,714 B1 * | 7/2001 | Sampsell et al. ........... | 711/154 |
| 6,263,487 B1 | 7/2001 | Stripf et al. ................ | 717/171 |
| 6,397,385 B1 | 5/2002 | Kravitz ....................... | 717/173 |
| 6,691,249 B1 * | 2/2004 | Barford et al. .............. | 714/25 |
| 2002/0082720 A1 * | 6/2002 | Birzer et al. ................ | 700/18 |
| 2003/0018892 A1 * | 1/2003 | Tello ........................... | 713/164 |

FOREIGN PATENT DOCUMENTS

| | | |
|---|---|---|
| DE | 195 49 154 A1 | 7/1997 |
| DE | 198 35 416 A1 | 2/2000 |
| EP | 0 534 884 A1 | 3/1993 |
| WO | WO 01/23971 | 4/2001 |
| WO | WO 01/47099 A1 | 6/2001 |

\* cited by examiner

*Primary Examiner*—Mano Padmanabhan
*Assistant Examiner*—Mardochee Chery
(74) *Attorney, Agent, or Firm*—Henry M. Feiereisen

(57) ABSTRACT

A controller, in particular a drive controller, includes a first functional block for at least one permanently installed controller function and a second functional block for at least one dynamically loadable controller function. The second functional block can be dynamically loaded and/or dynamically overwritten as well as started and/or executed while the controller is operating, without affecting the operation of the controller. During the operation of the controller, an additional function that is only temporarily required, can be loaded as needed, or an already loaded, but only temporarily required additional function can be dynamically loaded or overwritten by another temporarily required additional function.

19 Claims, 3 Drawing Sheets

REAL-TIME MOTOR CONTROLLER WITH ADDITIONAL DOWN-UP-LOADABLE CONTROLLER FUNCTIONALITY

CROSS-REFERENCES TO RELATED APPLICATIONS

This application claims the priority of German Patent Application, Serial No. 102 43 856.0, filed Sep. 20, 2002, pursuant to 35 U.S.C. 119(a)–(d), the disclosure of which is incorporated herein by reference.

BACKGROUND OF THE INVENTION

The invention relates to a controller, in particular a drive controller, with a permanently installed controller function and an additional dynamically loadable controller function, and to a method for operating such controller.

For controlling a system, in particular a drive, some functions of the controller are required permanently whereas other functions may be required only temporarily. The functions that are required permanently are referred to as basic functions of the controller. They can include, for example, a power/current control an/or a rotation speed control, for example, for the drive. The other functions, which are only required temporarily, are referred to as additional functions. These additional functions which may be required, for example, only during startup, may include diagnostic tools and/or setup tools.

The hardware resources available on the controller are often limited and the additional functions typically depend on the actual system to be controlled. It has so far proven difficult or impossible and expensive to integrate system-specific or application-specific additional functions in the controller in addition to the basic functions.

It would therefore be desirable and advantageous to provide an improved controller, which obviates prior art shortcomings and is able to specifically load control functions from an external source for temporary use in a control operation as needed, as well as a method for operating such controller.

SUMMARY OF THE INVENTION

According to one aspect of the invention, a controller, in particular a drive controller, includes a first functional block for at least one permanently installed controller function, and a second functional block for at least one dynamically loadable controller function. The second functional block can be dynamically loaded and/or dynamically overwritten with a real-time function during the operation of the controller.

This makes it possible to load an only temporarily required additional function, for example, from the Internet, during the operation of the controller, without interrupting the control functions. Alternatively, an already loaded, only temporarily required additional function can be dynamically loaded or dynamically overwritten by another temporarily required additional function.

According to an advantageous feature of the invention, the first functional block stores several real-time basic functions of the controller and the second functional block stores at least one real-time additional function of the controller. During the operation of the controller and/or during processing of the real-time basic function, the real-time additional function can be dynamically loaded and/or dynamically overwritten as well as started and/or executed in the second functional block without interrupting the real-time basic function. In this way, the hardware resources of the controller are not overburdened since the additional functions are loaded into the controller only as needed and can moreover be dynamically overwritten.

According to an advantageous feature of the invention, the real-time additional function can be dynamically loaded via the bus link from a management automation system or via an Internet connection.

The device can also include a device for runtime monitoring and a device for monitoring memory location access. The runtime monitoring device can determine the computing time required by the real-time additional function, and the real-time additional function can be terminated if the required computing time exceeds a predefined reference time. The device for monitoring memory location access can monitor memory addresses accessed by the real-time additional function, and the real-time additional function can be terminated if these memory addresses do not correspond to predefined reference memory addresses that are reserved for the real-time additional functions.

With this design of the controller according to the invention, the operation of the basic functions of the controller is advantageously not adversely affected when an additional function is loaded.

According to another advantageous feature of the invention, the device that monitors memory location access can manage a memory region with access rights for both the real-time basic functions and the real-time additional function. Copies of variables of the real-time basic functions can be stored in this memory region.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
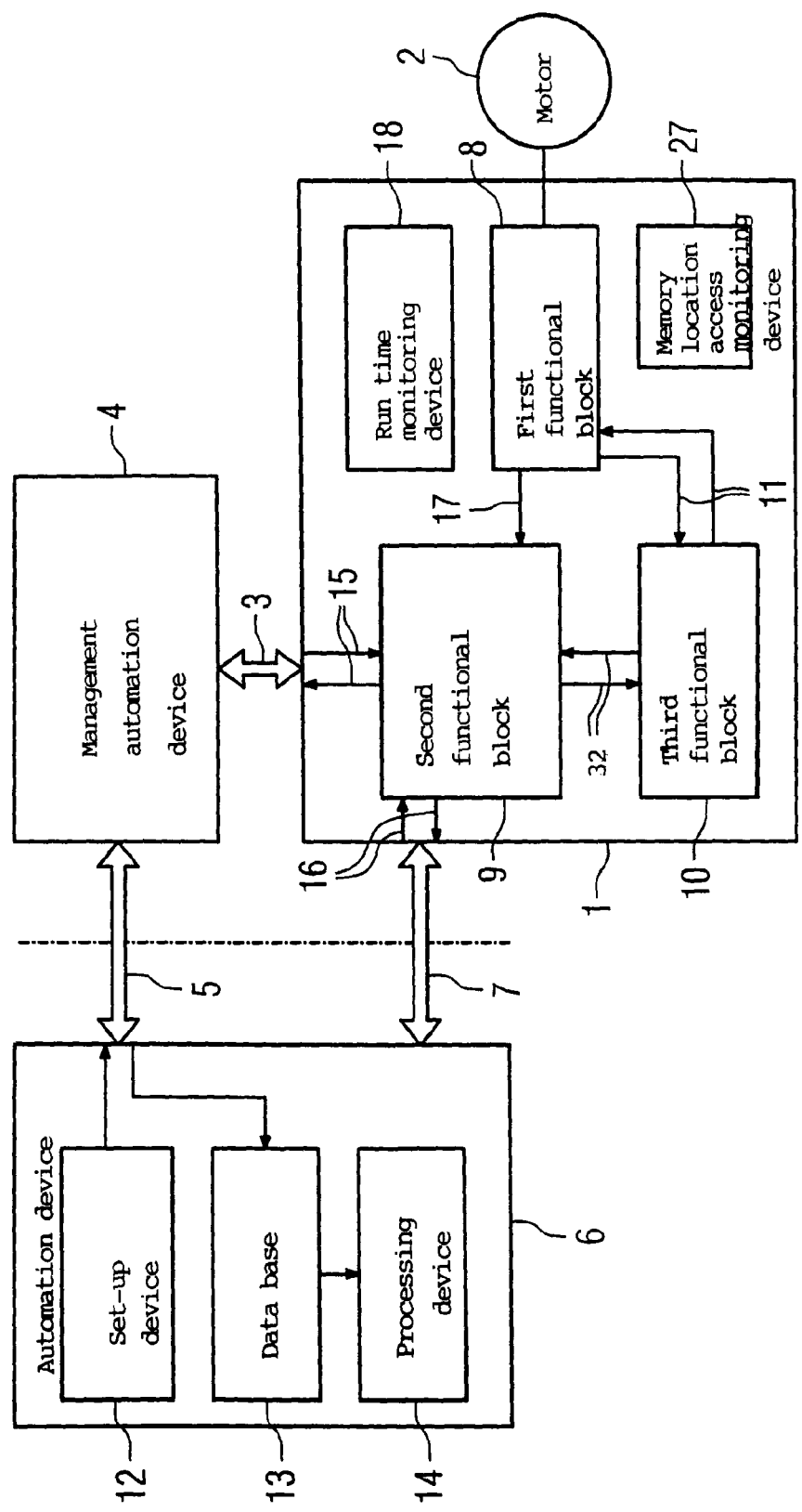
FIG. 1 shows a block diagram of a controller according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a drive controller which is connected with a drive to be controlled, for example a motor 2. According to FIG. 1, the drive controller 1 is connected to be a bus link 3 with a management automation device 4. The drive controller 1 and the automation device 4 can exchange data via the bus link 3.

In addition, FIG. 1 shows that the management automation device 4 is connected via an Internet connection 5 with another automation device 6 for data exchange with the other automation device 6 via the Internet connection 5. As also shown in FIG. 1, the drive controller 1 itself can also be connected directly with the other automation device 6 via an Internet connection 7. In this case, the drive controller 1 can exchange data directly with the automation device 6 without using the intervening management automation device 4.

The drive controller 1 can control the motor 2 in real-time. The real-time basic functions of the drive controller 1 which are necessary for controlling the motor 2 are stored in a first functional block 8 of the drive controller 1. These essential real-time basic functions of the drive controller 1 can include, for example, a power/current control or rotation speed control for the motor 2. In general, these real-time basic functions of the drive controller 1 are permanently required for controlling the motor 2 and are essentially independent of specific requirements of the machine or of a user. The real-time basic functions are therefore permanently installed in the first functional block of the drive controller 1.

A user frequently wishes to implement additional functions in the drive controller 1 in addition to the permanently installed real-time basic functions. These include so-called real-time additional functions which are, on one hand, not required during the entire operating time of the motor 2 and, on the other hand, depend on the specific requirements of the machine and/or user.

The drive controller 1 according to the invention can include a second functional block 9 for implementing these real-time additional functions in addition to the real-time basic functions. One or more real-time additional functions can be dynamically loaded into this functional block 9 as needed during the operation of the controller and hence during the execution of the real-time basic functions.

The real-time additional functions of the drive controller 1 which are currently resident in the second functional block 9, can be dynamically overwritten, if needed, by a new real-time additional function. The second functional block 9 can therefore be dynamically loaded as well as overwritten during the operation of the controller.

The real-time additional functions can be provided by the management automation device 4 and loaded into the second functional block 9 via the bus link 3. The management automation device 4 can load the real-time additional function (or each real-time additional function) also via the Internet connection 5 from the additional automation device 6 and transfer the real-time additional function(s) via the bus link 3 to the second functional block 9. Alternatively, the real-time additional function can also be provided by the automation device 6 and loaded directly from the drive controller 1 into the second functional block 9 via the Internet connection 7.

FIG. 1 depicts the cooperation between the real-time basic functions of the drive controller 1 and the real-time additional functions with reference to an exemplary diagnostic tool. As mentioned above, permanently installed real-time basic functions of the drive controller 1 are stored in the first functional block 8. These include, for example, the current control or drive control for the drive controller 1. In addition, machine-independent as well as user-independent diagnostic functions can be permanently integrated and thereby permanently installed in a third functional block 10. Such machine-independent or user-independent diagnostic functions can include, for example, a trace function or an FFT function. Trace functions can be used to record internal signals of the drive controller with equidistant clock pulses. FFT functions make it possible to perform a frequency analysis of the measurement values recorded using the trace function. It will be understood that the permanently installed diagnostic tools in the third functional block 10 of the drive controller 1 must access data of the first functional block 8, namely the real-time basic functions. This is indicated in FIG. 1 by the arrows 11.

If the controller 1 is to execute additional machine-specific and/or user-specific diagnostic functions in addition to the machine-nonspecific or user-nonspecific functions which are permanently installed in the first and optionally third functional block 8 and 10, respectively, of the drive controller 1, then these functions can be dynamically loaded into the second functional block 9, as mentioned above, during the operation of the drive controller 1 and hence during the execution of the real-time basic functions, without interrupting the real-time basic functions.

Such real-time additional function which is to be dynamically loaded into the second functional block 9, can be set up on the automation device 6 with the help of a set-up device 12 and then loaded into the second functional block 9 of the drive controller 1 either by intermediately connecting the management automation device 4 or directly without such intermediate connection of the automation device 4 via the corresponding Internet connection 5 or 7. The real-time additional function loaded into the second functional block 9 which in the depicted example executes machine-specific and hence also user-specific diagnostic functions, supplies corresponding measurement values to the automation device 6 via the Internet connection 5 or 7, respectively. The measurement values are then stored in a database 13 and transmitted to a processing device 14. The data exchange between the second functional block 9 and the real-time additional functions stored in the second functional block and the management automation device 4 or the automation device 6 is indicated in FIG. 1 by arrows 15, 16.

As mentioned above, the machine-specific and/or user-specific real-time additional functions which are loaded into the second functional block 9, can be dynamically loaded into the second functional block 9 while the real-time basic functions are executed. The execution of the real-time basic functions that are permanently installed in the first functional block 8, as well as the execution of the machine-independent diagnostic tools that are permanently installed in this third functional block 10, are therefore not adversely affected when the machine-specific real-time additional functions are dynamically loaded into the second functional block 9. As shown clearly in FIG. 1, interfaces between the first functional block 8 and the second functional block 9 as well as between the third functional block 10 and the second functional block 9 are required for executing the real-time additional functions that are dynamically loaded into the second functional block 9.

Data of the real-time basic functions have to be transmitted to the second functional block 9 for executing the machine-specific real-time additional functions. This is indicated in FIG. 1 by an arrow 17. Data may also have to be exchanged with the machine-independent diagnostic functions stored in the third functional block 10 when executing the machine-specific additional functions which are dynamically loaded into the second functional block 9. This is indicated in FIG. 1 by the arrows 32.

A runtime monitoring device 18 is provided to allow dynamical loading of the real-time additional functions during the operation of the controller and hence also during the execution of the real-time basic functions, without impeding their operation.

The runtime monitoring device 18 ensures that the cyclical functions conventionally executed on the drive controller 1, i.e., the real-time basic functions of the first functional block 8 and optionally the machine-independent diagnostic functions of the third functional block 10, are not adversely affected by the demand for computing power when the real-time additional functions of the second functional block 9 are dynamically loaded.

For this purpose, the runtime monitoring device 18 determines the computing time required by one ore more of the real-time additional functions of the functional block 9, wherein the or each real-time additional function is terminated if the computing time required by the real-time additional function exceeds a predefined reference time.

The reference time represents a maximal allowable computing time for the subsequently dynamically loadable real-time additional functions that is defined and/or parameterized during the startup of the drive controller 1. For this purpose, a so-called Null-function is installed in the drive controller 1. This Null-function consumes the maximal allowable computing time of the real-time additional function that was parameterized during startup, without actually executing the function. The Null function is overwritten by the dynamically loadable real-time additional function when the real-time additional function is dynamically loaded into the second functional block 9. Starting up the drive controller 1 with the Null function ensures that computing time problems do not arise after the real-time additional function have been dynamically loaded into the second functional block 9.

The runtime monitoring device 18 thus monitors the computing time required by the dynamically loadable real-time additional function(s). This will be described in more detail below with reference to FIGS. 3 and 4.

Figure 3:
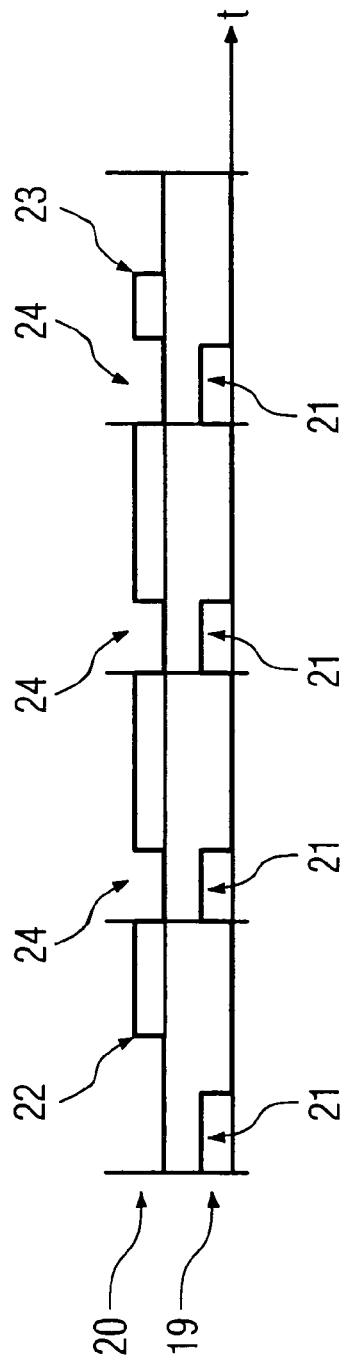
FIG. 3 shows a diagram for visualizing the time monitoring functionality of the controller according to the invention.

FIG. 3 shows two tasks 19, 20 to be executed by the drive controller 1. The first tasks 19 represents a real-time basic function, the second task 20 represents a dynamically loadable real-time additional function. The task 19 of the real-time basic function is cyclically activated and processed with a predefined clock rate. Blocks 21 indicate the computing time used by the real-time basic function during a cycle. The priority of task 19 of the real-time basic function is higher than the priority of task 20 of the real-time additional function. For example, FIG. 3 shows that the task 20 of the real-time additional function is started at a time 22 in the first depicted cycle, while the task 19 of the real-time basic function has already been processed during this cycle. As soon as the task 19 of the real-time basic function is once again activated at the beginning of a new cycle, the task 20 of the real-time additional function is deactivated until the task 19 of the real-time basic function is processed within the second cycle. Only then is the real-time additional function activated again. This is repeated cyclically and sequentially as many times as necessary until the task 20 of the real-time additional function is completed at time 23. The arrows 24 in FIG. 3 indicate the interruption of the task 20 of the real-time additional function by the task 19 of the real-time basic function which has a higher priority.

This indicates that an overall computing time has to be distinguished from a net computing time of task 20 of the real-time additional function. The overall computing time refers to the absolute time elapsed between the two times 22 and 23, i.e., between starting and ending the task 20. The net computing time of the task 20 is obtained by subtracting from the absolute time between the time 22 and the time 23 the time at which the task 20 of the real-time additional function is interrupted by the tasks 19 of the real-time basic function with the higher priority.

The runtime monitoring device 18 preferably includes several timers for precisely measuring the net computing time and the overall computing time of task 20 of the real-time additional function. The timers (not shown in detail) can be controlled and/or started and stopped by software interrupts and/or hardware interrupts. A first timer is started during a cyclical call of a dynamically loadable real-time additional function by a corresponding software interrupt at time 22 and likewise stopped at the end of the corresponding task at time 23 by a software interrupt. This first timer is therefore used to determine the overall computing time of the task 20 of the dynamically loaded real-time additional function.

Figure 4:
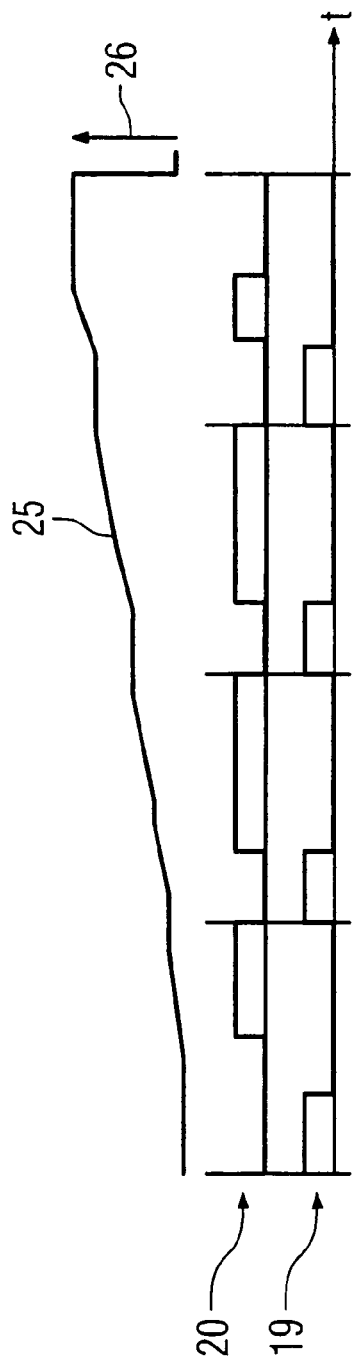
FIG. 4 shows another diagram for visualizing the time monitoring functionality of the controller according to the invention.

Also included is a second timer which can be stopped and started in addition by corresponding interrupts of the task 19 of a real-time basic function of the drive controller 1 with a higher priority. This second timer is stopped when the task 19 of the real-time basic function with the higher priority is started. Accordingly, the second timer is started when the task 19 of the real-time basic function with the higher priority is completed. This ensures that the second timer continues to count only if the second task 20 of the real-time additional function actually uses up computing time. FIG. 4 illustrates the net computing time of task 20 determined by the second timer in form of a curve 25, wherein the arrow 26 indicates the counter content of the second timer and hence the determined net computing time of the dynamically loadable real-time additional function.

According to the invention, the determined net computing time is compared with a predefined reference time, i.e. the maximal allowable computing time for the dynamically loadable real-time additional function. If the net computing time exceeds this reference time, then the dynamically loadable real-time additional function is terminated, with the drive controller generating a corresponding error message. In this way, the functionality of the real-time basic function is not adversely affected by the inclusion of the dynamically loadable real-time additional function while the drive controller is operating and the real-time basic functions are executing. The determined overall computing time of the dynamically loaded real-time additional function can also be compared with a reference value for the overall running time. This ensures that a real-time additional function that is to be dynamically loaded can be reliably processed.

According to another aspect of the invention, a memory location access monitoring device 27 is provided, as depicted in FIG. 1.

The memory location access monitoring device 27 ensures that the real-time additional functions dynamically loaded into the second functional block 9 do not access memory addresses or memory regions that are reserved for the real-time basic functions that are permanently installed in the first functional block 8. This prevents incorrect memory access of a real-time additional function dynamically loaded during the operation of the drive controller 1 and hence during the execution of the real-time basic functions. The memory location access monitoring device 27 monitors all memory addresses accessed by the dynamically loaded real-time additional functions. If these memory addresses do not match the predefined reference memory addresses reserved for the real-time additional functions, then the dynamically loaded real-time additional function is terminated, and a corresponding error message is generated by the drive controller 1.

A separate memory regions is reserved for the dynamically loadable real-time additional functions when the drive controller 1 starts up. The real-time additional functions that can be dynamically loaded during the operation of the drive controller 1 can only access this separate memory region. To nevertheless enable communication between the real-time basic functions and the dynamically loaded real-time additional functions, the real-time basic functions write copies of their internal valuables into this defined permanent memory region. A dynamically loaded real-time additional function can hence only operate on the copies of the variables of the real-time basic functions that are stored in the permanently defined memory region, if the dynamically loaded real-time additional function manipulates a variable of a dynamically loaded real-time basic function in an undesirable manner. The actual valuables of the real-time basic functions which have memory addresses that are inaccessible to the real-time additional functions then remain unchanged. Due to the structure of the drive controller 1 of the invention, a flawed real-time additional function therefore does not adversely affect the functionality of the real-time basic functions.

In other words, the memory location access monitoring device 27 administers two defined memory regions. A first defined memory region is only accessible to the real-time basic functions of the first functional block 8. A second memory region can be addressed by the real-time basic functions and in addition by the dynamically loadable real-time additional functions of second functional block 9. Copies of the variables of the real-time basic functions are stored in this second memory region.

Figure 2:
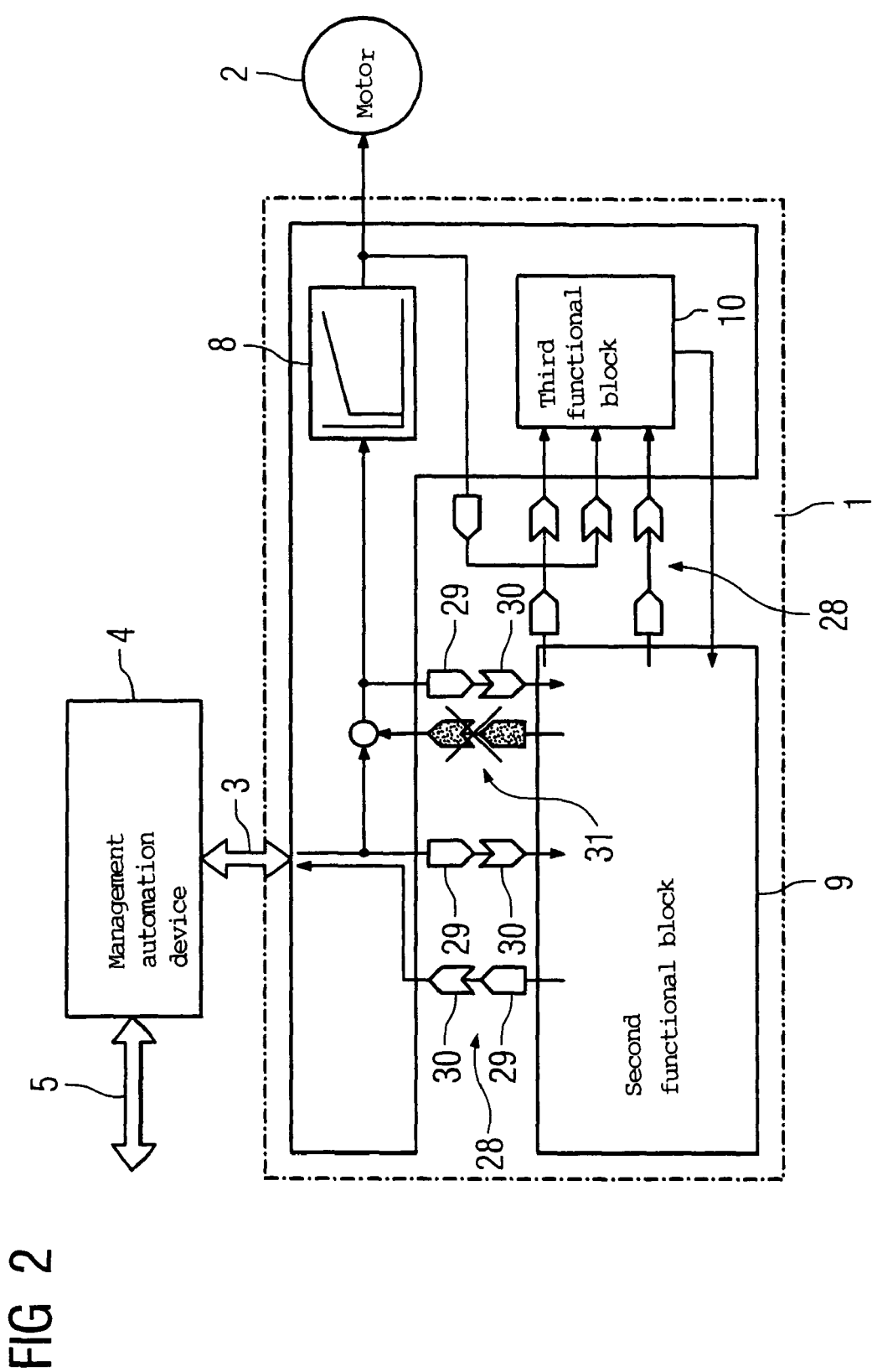
FIG. 2 shows a detailed block diagram of the control according to the invention.

The drive controller 1 according to the invention enables data exchange between permanently installed, machine-independent functions, such as the real-time basic functions of the first functional block 8 and the machine-independent diagnostic functions of the third functional block 10, as well as the dynamically loadable, machine-specific real-time additional functions of the second functional block 9 via so-called binector/connector connections. FIG. 2 shows several binector/connector connections 28. Each of these binector/connector connections includes a signal source 29 and a corresponding signal sink 30. In this way, depending on the direction of the data flow, signal sources 29 or signal sinks 30 are associated with the second functional block 9 for the dynamically loadable real-time additional functions or with the functional blocks 8 and 10, respectively, for the permanently installed functions of the drive controller 1.

For security reasons, limitations are implemented for such binector/connector connections 28 when a real-time additional function is dynamically loaded. For example, when a real-time additional function is dynamically loaded, no binector/connector connections that have been set up during the installation of the drive controller 1 are to be severed. Otherwise, the functionality of the parallel-running real-time basic functions of the drive controller 1 could be impaired by a flawed real-time additional function to be dynamically loaded. Moreover, no signals must be supplied from the dynamically loadable real-time additional functions to the parallel-running real-time basic function, which could also affect the functionality of the real-time basic functions. This limitation is indicated in FIG. 2 by crossing out a binector/connector connection 31 that would otherwise indicate such an additive overlay.

The drive controller 1 according to the invention, unlike conventional devices, can be used to dynamically load machine-specific and/or user-specific real-time additional functions while the drive controller 1 is operating, in particular while real-time basic functions of the drive controller are executing. The use of the runtime monitoring device 18 and the memory location access monitoring device 27 makes it impossible to affect the permanently installed real-time basic functions of the drive controller 1 while likely real-time additional functions are dynamically loaded.

The real-time additional functions can be loaded from a management automation device 4 via a bus link 3, as well as from an additional automation device 6 via an Internet connection 5 and 7, respectively. According to the invention, the dynamically loadable additional functions are decoupled from the permanently installed basic functions of the drive controller. Hardware resources for the drive controller 1, for example the memory size, can be used more economically, since additional functions that are required only temporarily are dynamically loaded by the drive controller 1 as needed, and since already loaded additional functions that are no longer needed are dynamically overwritten. The invention provides a drive controller, into which, on one hand, only machine-independent and user-independent basic functions and optionally diagnostic functions are integrated and, on the other hand, machine-specific and user-specific additional functions can be dynamically loaded as needed, without interrupting the operation of the drive controller 1 or its basic functions. This provides many possibilities for the integration of machine-specific diagnostic functions, maintenance functions or other updates for the drive controller 1.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A drive controller for a drive of an electric machine, comprising
    a first functional block having at least one permanently installed controller function for storing at least one basic real-time function for controlling the drive; and
    a second functional block having at least one dynamically loadable controller function for storing at least one additional real-time function for controlling the drive,
    wherein the second functional block can be dynamically loaded or dynamically overwritten with the at least one additional real-time function during operation of the controller, and
    wherein during operation or during processing of the at least one basic real-time function, the at least one additional real-time function is dynamically loaded or dynamically overwritten or started or executed in the second functional block without interrupting the at least one basic real-time function.

2. The controller of claim 1, and further comprising a bus link, wherein the at least one additional real-time function is loaded via the bus link from a management automation system.

3. The controller of claim 1, wherein the at least one additional real-time function is loaded via an Internet connection.

4. A drive controller for a drive of an electric machine, comprising
a first functional block having at least one permanently installed controller function for storm at least one basic real-time function for controlling the drive;
a second functional block having at least one dynamically loadable controller function for storing at least one additional real-time function for controlling the drive; and
a device for runtime monitoring,
wherein the second functional block can be dynamically loaded or dynamically overwritten with the at least one additional real-time function during operation of the controller, and
wherein the runtime monitoring device determines a computing time required by the at least one additional real-time function, and wherein the at least one additional real-time function is terminated if the required computing time exceeds a predefined reference time.

5. The controller of claim 4, and further comprising a bus link, wherein the at least one additional real-time function is loaded via the bus link from a management automation system.

6. The controller of claim 4, wherein the at least one additional real-time function is loaded via an Internet connection.

7. A drive controller for a drive of an electric machine, comprising
a first functional block having at least one permanently installed controller function for storing at least one basic real-time function for controlling the drive;
a second functional block having at least one dynamically loadable controller function for storing at least one additional real-time function for controlling the drive; and
a device for monitoring memory location access,
wherein the second functional block can be dynamically loaded or dynamically overwritten with the at least one additional real-time function during operation of the controller, and
wherein the device for monitoring memory location access monitors memory addresses accessed by the at least one additional real-time function, and wherein the at least one additional real-time function is terminated if these memory addresses do not correspond to predefined reference memory addresses that are reserved for the at least one additional real-time function.

8. The controller of claim 7, wherein the device for monitoring memory location access administers a memory region with access rights for both the at least one basic real-time functions and the at least one additional real-time function, and wherein copies of variables of the at least one basic real-time function are stored at this memory region.

9. The controller of claim 7, and further comprising a bus link, wherein the at least one additional real-time function is loaded via the bus link from a management automation system.

10. The controller of claim 7, wherein the at least one additional real-time function is loaded via an Internet connection.

11. A method for operating a drive controller for an electric machine comprising the steps of:
executing on the drive controller at least one permanently installed controller function for storing a basic real-time function for controlling the electric machine, and
dynamically loading or dynamically overwriting at least one additional real-time function during operation of the controller and during execution of the permanently installed controller function,
wherein for controlling the drive of the electric machine, several basic real-time functions of the controller are executed, and wherein during the operation or execution of the basic real-time functions the at least one additional real-time function is dynamically loaded or dynamically overwritten or started or processed without interrupting the basic real-time functions.

12. The controller of claim 11, and further comprising a bus link, wherein the at least one additional real-time function is loaded via the bus link from a management automation system.

13. The controller of claim 11, wherein the at least one additional real-time function is loaded via an Internet connection.

14. A method for operating a drive controller for an electric machine comprising the steps of:
executing on the drive controller at least one permanently installed controller function for storing a basic real-time function for controlling the electric machine, and
dynamically loading or dynamically overwriting at least one additional real-time function during operation of the controller and during execution of the permanently installed controller function,
wherein a computing time required by the at least one additional real-time function is determined, and wherein the at least one additional real-time function is terminated if the required computing time exceeds a predefined reference time.

15. The controller of claim 14, and further comprising a bus link, wherein the at least one additional real-time function is loaded via the bus link from a management automation system.

16. The controller of claim 14, wherein the at least one additional real-time function is loaded via an Internet connection.

17. A method for operating a drive controller for an electric machine, comprising the steps of:
executing on the drive controller at least one permanently installed controller function for storing a basic real-time function for controlling the electric machine, and
dynamically loading or dynamically overwriting at least one additional real-time function during operation of the controller and during execution of the permanently installed controller function,
wherein memory addresses accessed by the at least one additional real-time function are monitored and wherein the at least one additional real-time function is terminated if these memory addresses do not correspond to predefined reference memory addresses reserved for the at least one additional real-time function.

18. The controller of claim 17, and further comprising a bus link, wherein the at least one additional real-time function is loaded via the bus link from a management automation system.

19. The controller of claim 17, wherein the at least one additional real-time function is loaded via an Internet connection.

* * * * *